United States Patent Office 3,442,155
Patented May 6, 1969

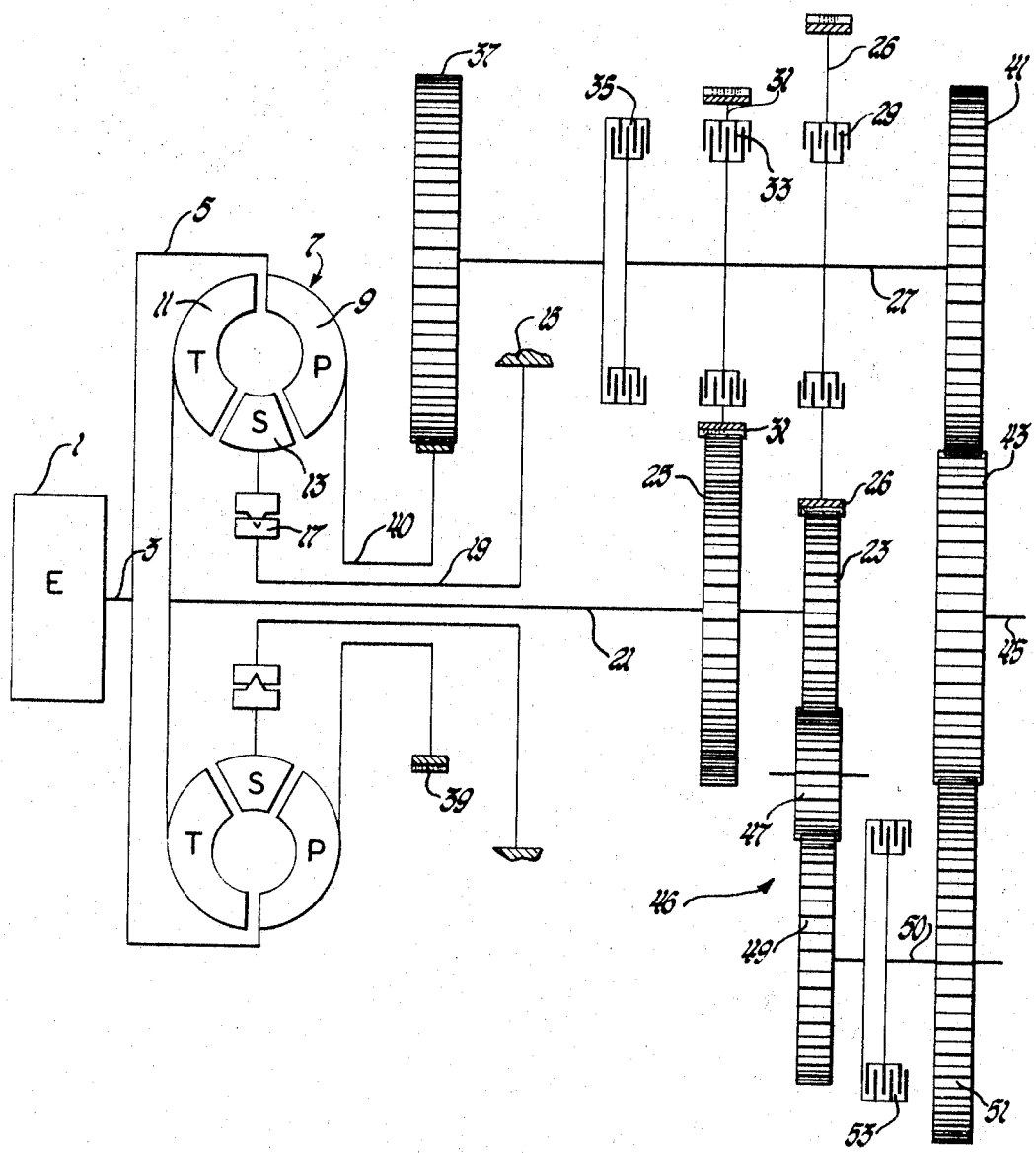

3,442,155
COUNTERSHAFT TRANSMISSION
William B. Clark, Acton, Ind., assignor to General Motors Corporation, Detroit, Mich., a corporation of Delaware
Filed Nov. 2, 1966, Ser. No. 591,499
Int. Cl. F16h 47/06
U.S. Cl. 74—720  5 Claims

ABSTRACT OF THE DISCLOSURE

Power transmission in which there is torque converter drive of a countershaft coupled to the transmission output through low and intermediate speed gearsets. There is an all-mechanical drive of the countershaft for higher speed operation. Reverse drive gearing is driven by the converter and each range is established by the engagement of an associated clutch.

---

This invention relates to power transmissions and more particularly to a countershaft transmission including both hydraulic and mechanical drives providing a plurality of drive ratios which are engaged by selective application of one friction device for each of the ratios.

The preferred embodiment of this transmission involves a simple arrangement of countershaft-mounted spur gears which engage torque converter-driven spur gearing providing low and intermediate drive ranges in which the torque converter is advantageously used for torque multiplication and cushioning of the drive line. In addition to the hydraulically driven ranges, this transmission includes a direct mechanical drive into the countershaft and to an output providing a highly efficient high range. A hydraulically driven reverse ratio is provided for reverse drives. In this transmission it is necessary to engage only one friction device or clutch for establishing each of the various transmission ratios, thus requiring fewer friction elements and providing a simplified transmission. By virtue of the fact that the clutch parts are rotating at relatively low speeds when engaged, slow speed clutches are provided improving clutch performance and life.

It is an object of this invention to provide a multiratio countershaft transmission in which ratio change is effected by the engagement of a single friction unit for each of the ratios.

Another object of this invention is to provide a countershaft transmission including a first power path having hydraulically driven low and intermediate range drive ratios and a second power path having a mechanically driven high range drive ratio and further including low speed friction unit ratio control.

Another object of this invention is to provide a multi-ratio countershaft transmission having a torque converter-driven main shaft with gearing which meshes with countershaft gearing and having a single friction device for establishing each of the ratios and including direct mechanical high range drive.

Another object of this invention is to provide a simplified countershaft transmission having a torque converter-driven main shaft with gearing that meshes with countershaft gearing and controlled by a plurality of friction clutches for establishing hydraulic drives and including direct mechanical drive of the countershaft on application of a friction unit directly coupling the countershaft with torque converter input for establishing high range mechanical drive.

These and other objects of this invention will become more apparent from the following detailed description and drawing in which:

The single figure is a diagrammatic view of a torque converter multiratio countershaft transmission.

As shown in the figure there is an engine 1 for driving shaft 3 which is connected to housing 5 of a three-element hydrodynamic torque converter 7. The torque converter includes a pump 9 suitably secured to the housing, turbine 11 and stator 13. The stator is operatively connected to the transmission case or ground 15 through a one-way brake 17 and sleeve shaft 19. The turbine is connected to drive a drive shaft 21 to which spaced spur gears 23 and 25 are secured. The spur gear 23 meshes with a spur gear 26 which may be clutched to lay or countershaft 27 by friction clutch unit 29. The spur gear 25 meshes with a spur gear 31 which may be clutched to the countershaft 27 by clutch 33.

A clutch unit 35 having a clutch plate supported at the forward end of the countershaft may be clutched to the spur gear 37 which meshes with the spur gear 39 connected to sleeve shaft 40 and directly driven by the torque converter pump 9. The other end if the countershaft supports a gear 41 that meshes with the output gear 43 connected to the output shaft 45. This transmission as illustrated also includes a reverse drive ratio provided by a gear train 46 having a reverse idler 47 meshing with the intermediate shaft spur gear 23 and spur gear 49. Gear 49 may be operatively connected to drive a shaft 50 and a spur gear 51 on application of clutch 53. Spur gear 51 meshes with output gear 43 for driving the output shaft 45 in a reverse direction when the reversing gear train is engaged in the drive line.

The ratios listed below are preferable, however, it will be understood that other suitable ratios may be utilized. The converter has a stall torque ratio of 2.0, meshing gears 23 and 26 have a ratio of 2.06, meshing gears 25 and 31 have a ratio of 1.0, meshing gears 39 and 37 have a speed-increasing ratio of 1.71, gears 41 and 43 have a speed-decreasing ratio of 1.71 and the reverse ratio can be an overall mechanical ratio of 3.5:1. The schedule below describes the application of the various clutches to establish the different drive ranges.

| Gear Range | Clutch Engaged | | | | Mech. Ratio | Overall Ratio |
|---|---|---|---|---|---|---|
| | 35 | 33 | 29 | 53 | | |
| 1 | | | X | | 3.5 | 7.0 |
| 2 | | X | | | 1.71 | 3.42 |
| 3 | X | | | | 1.00 | 1.00 |
| Rev | | | | X | 3.5 | 7.0 |

It will be seen that only one friction-drive-establishing device is used for each of the various ranges, thus eliminating the former requirement for a plurality of devices for establishing the drives. Furthermore, it will be seen that the power path for the first and second gear ranges is through the torque converter which provides for the desirable cushioning and the necessary torque multiplication for these drives. The power path for the high range or third gear range is a 100 percent mechanical drive and therefore highly efficient; reverse is a hydraulic drive with clutch 53 engaged.

In addition to the benefits obtained by only having one clutch used for each of the drive ranges, it will be seen that clutches 29, 33 and 35 are low-speed clutches by virtue of the fact that there is small relative speed differential between the drive and the driven parts of these clutches upon engagement of the friction plates. This is due to the fact that the lay shaft 27 will be driven by the ratio provided by gears 23 and 26 when clutch 33 is engaged and the drive and driven parts of the clutch 35 will have a differential speed determined by the speed of pump 9 and the ratio of gears 25 and 31.

It will be understood that other embodiments may be made utilizing applicant's teachings and that applicant is

I claim:

1. A power transmission comprising transmission input means and output means, a hydrodynamic unit having an input rotor operatively connected to said transmission input means and having output rotor means, first and second gearsets respectively providing first and second speed ratios, each of said gearsets having an input gear operatively connected to said output rotor means and having an output gear, a countershaft, first and second clutch means respectively connected to said first and second gearsets and selectively engageable to couple each said respective output gear to said countershaft, transmission means for drivingly connecting said countershaft to said transmission output means so that said transmission input means can hydraulically drive said transmission output means through said first gearset when only said first clutch means is engaged and through said second gearset when only said second clutch means is engaged, and additional transmission means including third clutch means selectively engageable to connect said transmission input means to said countershaft so that said input means can mechanically drive said output means when only said third clutch means is engaged.

2. The power transmission of claim 1, wherein said first mentioned transmission means includes a third gearset drivingly connecting said countershaft to said transmission output means and wherein said additional transmission means includes a fourth gear set drivingly connecting said transmission input means to said third clutch means which operates in conjunction with said third gearset to provide a third speed ratio.

3. The power transmission of claim 2 and further including a reverse gearset driven by said input gear of said first gearset and drive means including a selectively engageable clutch for drivingly connecting said reverse gearset to said transmission output means.

4. A power transmission comprising transmission input means and output means, a hydrodynamic torque converter having a pump operatively connected to said input means and having a turbine, first drive means operatively connected to said turbine, first and second gearsets each having an input gear operatively connected to said drive means and each having an output gear which meshes with the respective input gear, a countershaft, second drive means drivingly connecting said countershaft to said transmission output means, first clutch means selectively engageable to drivingly connect said output gear of said first gearset to said countershaft and thereby condition said transmission for first speed hydraulic drive, second clutch means selectively engageable to drivingly connect said output gear of said second gearset to said countershaft and thereby condition said transmission for a second speed hydraulic drive and third drive means including selectively engageable third clutch means to connect said transmission input means to said countershaft for conditioning said transmission for a third speed all-mechanical drive.

5. The power transmission of claim 4 and further including a reverse gearset driven by said input gear of said first gearset and drive means including a selectively engageable clutch engageable to drivingly connect said reverse gearset to said transmission output means.

References Cited

UNITED STATES PATENTS

| | | | |
|---|---|---|---|
| 2,739,487 | 3/1956 | Winther | 74—330 |
| 2,897,690 | 8/1959 | Maier | 74—720 |
| 3,080,772 | 3/1963 | Foerster | 74—688 |
| 3,138,964 | 6/1964 | Stockton | 74—330 |

DONLEY J. STOCKING, *Primary Examiner.*

HENRY S. LAYTON, *Assistant Examiner.*